(12) United States Patent
Chouhan et al.

(10) Patent No.: US 10,138,736 B2
(45) Date of Patent: Nov. 27, 2018

(54) TURBOMACHINE BLADE TIP SHROUD

(71) Applicant: General Electric Company,
Schenectady, NY (US)

(72) Inventors: Rohit Chouhan, Bangalore (IN);
Sumeet Soni, Bangalore (IN); Paul Kendall Smith, Simpsonville, SC (US);
Srinivasa Govardhan Jayana, Bangalore (IN); Sylvain Pierre, Greer, SC (US); Harish Bommanakatte, Bangalore (IN); Spencer Aaron Kareff, Simpsonville, SC (US)

(73) Assignee: General Electric Company,
Schenectady, NY (US)

( * ) Notice: Subject to any disclaimer, the term of this patent is extended or adjusted under 35 U.S.C. 154(b) by 547 days.

(21) Appl. No.: 14/949,544

(22) Filed: Nov. 23, 2015

(65) Prior Publication Data
US 2016/0076385 A1 Mar. 17, 2016

Related U.S. Application Data

(63) Continuation-in-part of application No. 14/824,953, filed on Aug. 12, 2015, which is a continuation of
(Continued)

(51) Int. Cl.
*F01D 5/22* (2006.01)
*F01D 11/02* (2006.01)
(Continued)

(52) U.S. Cl.
CPC .............. *F01D 5/225* (2013.01); *F01D 5/143* (2013.01); *F01D 11/02* (2013.01); *F04D 29/164* (2013.01);
(Continued)

(58) Field of Classification Search
CPC .......... F01D 5/225; F01D 5/143; F01D 11/02; F04D 29/164; F05D 2240/303; F05D 2240/307; F05D 2250/73
(Continued)

(56) References Cited

U.S. PATENT DOCUMENTS

| | | | |
|---|---|---|---|
| 2,221,685 A | * | 11/1940 | Smith ................. F01D 5/225 416/191 |
| 2,772,854 A | * | 12/1956 | Rene ................... F01D 5/22 416/190 |

(Continued)

FOREIGN PATENT DOCUMENTS

| CN | 1162346 A | 10/1997 |
|---|---|---|
| CN | 101235728 A | 8/2008 |

(Continued)

OTHER PUBLICATIONS

U.S. Appl. No. 14/824,953, filed Aug. 12, 2015, Chouhan, et al.
(Continued)

*Primary Examiner* — Aaron R Eastman
(74) *Attorney, Agent, or Firm* — Fletcher Yoder P.C.

(57) ABSTRACT

Embodiments of the present disclosure are directed toward systems including a turbomachine blade tip shroud having a pressure side portion and a suction side portion. The pressure side portion and the suction side portion are divided by a mean camber line of a turbomachine blade, and the pressure side portion has a greater surface area than the suction side portion.

17 Claims, 5 Drawing Sheets

Related U.S. Application Data application No. 13/355,436, filed on Jan. 20, 2012, now Pat. No. 9,109,455.

(51) Int. Cl.
  *F04D 29/16* (2006.01)
  *F01D 5/14* (2006.01)

(52) U.S. Cl.
  CPC .. *F05D 2240/303* (2013.01); *F05D 2240/307* (2013.01); *F05D 2250/73* (2013.01); *Y02T 50/671* (2013.01); *Y02T 50/673* (2013.01)

(58) Field of Classification Search
  USPC ........................................................ 415/173.5
  See application file for complete search history.

(56) References Cited

U.S. PATENT DOCUMENTS

| | | | | |
|---|---|---|---|---|
| 3,056,583 | A * | 10/1962 | Ernest | F01D 9/042 415/173.4 |
| 4,710,099 | A * | 12/1987 | Matsuura | F01D 5/30 415/181 |
| 5,211,540 | A * | 5/1993 | Evans | F01D 5/225 416/190 |
| 5,261,785 | A * | 11/1993 | Williams | F01D 25/32 415/169.2 |
| 5,482,435 | A | 1/1996 | Dorris et al. | |
| 7,628,587 | B2 * | 12/2009 | McFeat | F01D 5/141 416/189 |
| 2004/0179937 | A1 * | 9/2004 | Kreis | F01D 5/22 415/170.1 |
| 2005/0013692 | A1 * | 1/2005 | Snook | F01D 5/225 416/191 |
| 2007/0231143 | A1 | 10/2007 | Boegli et al. | |
| 2008/0075600 | A1 * | 3/2008 | Moors | F01D 5/225 416/189 |
| 2008/0170946 | A1 | 7/2008 | Brittingham et al. | |
| 2008/0292466 | A1 * | 11/2008 | Tragesser | F01D 5/225 416/223 R |
| 2009/0053047 | A1 * | 2/2009 | Chiurato | F01D 5/225 415/173.1 |
| 2009/0164037 | A1 * | 6/2009 | Menuey | F01D 5/225 700/103 |

FOREIGN PATENT DOCUMENTS

| | | |
|---|---|---|
| EP | 1498578 A1 | 1/2005 |
| JP | H10-266804 A | 10/1998 |
| JP | H11-500507 A | 1/1999 |
| JP | 2000-018003 A | 1/2000 |
| SU | 1059222 A1 | 12/1983 |

OTHER PUBLICATIONS

Extended European Search Report and Opinion issued in connection with corresponding EP Application No. 13151449.9 dated Jul. 29, 2015.
Second Office Action and Search issued in connection with corresponding CN Application No. 201310020790.5 dated Jan. 18, 2016.
Office Action issued in connection with corresponding EP Application No. 13151449.9 dated Oct. 25, 2016.
Preliminary Rejection issued in connection with corresponding JP Application No. 2013-005858 dated Oct. 25, 2016.
Office Action issued in connection with corresponding RU Application No. 2013102138 dated Nov. 18, 2016.

* cited by examiner

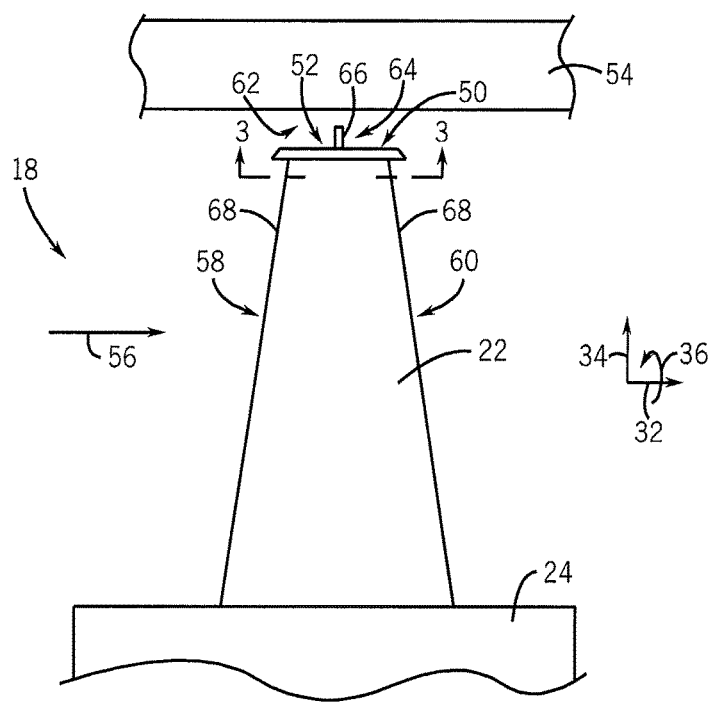
FIG. 2
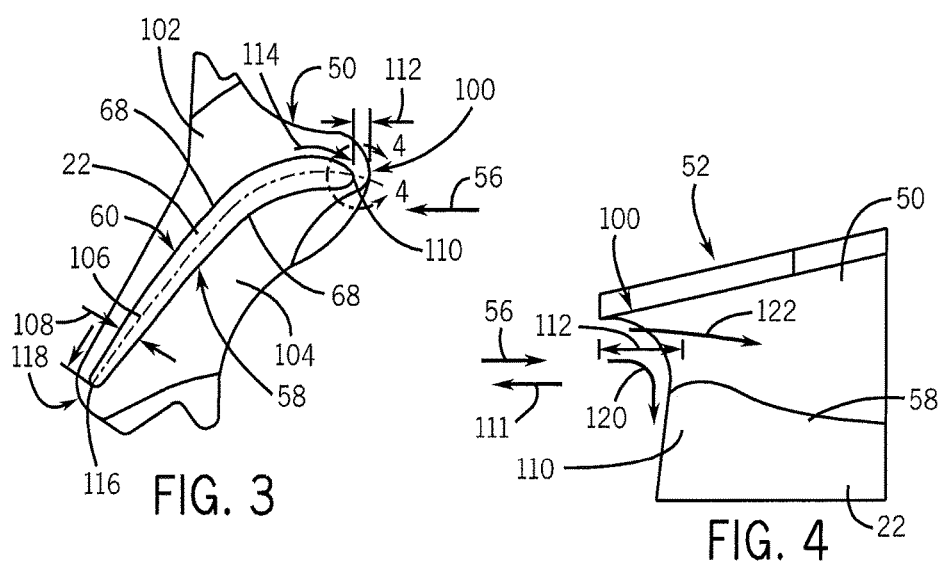
FIG. 3
FIG. 4

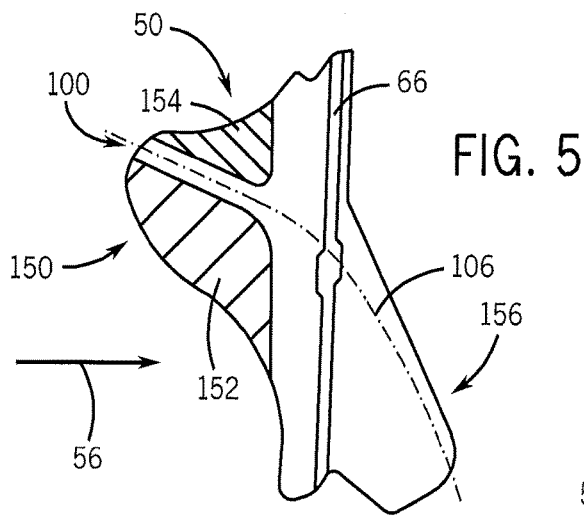
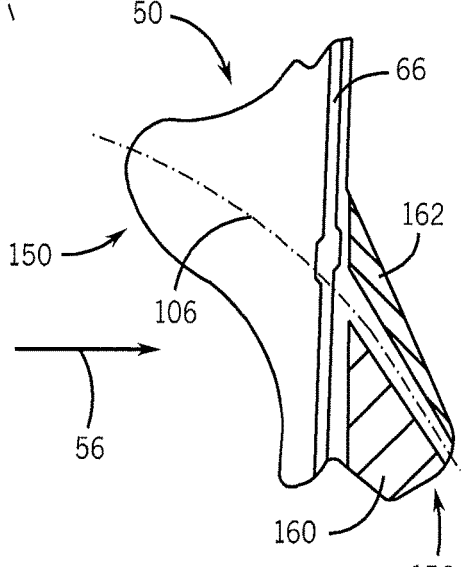
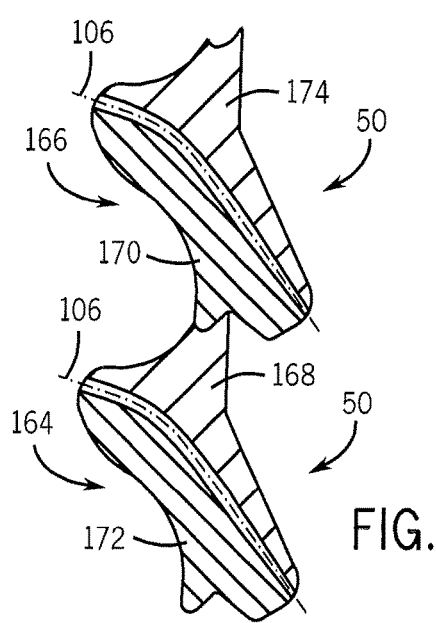

TURBOMACHINE BLADE TIP SHROUD

CROSS-REFERENCE TO RELATED APPLICATIONS

This application is a continuation-in-part of and claims priority from and the benefit of U.S. application Ser. No. 14/824,953, entitled "TURBOMACHINE BLADE TIP SHROUD," filed Aug. 12, 2015, which is a continuation of and claims priority from and the benefit of U.S. application Ser. No. 13/355,436, entitled "TURBOMACHINE BLADE TIP SHROUD," filed Jan. 20, 2012, the disclosures of which are hereby incorporated by reference in their entireties for all purposes.

BACKGROUND OF THE INVENTION

The subject matter disclosed herein relates to turbomachines, and, more particularly, to improved tip shroud geometries for a turbomachine blade.

Turbomachines include compressors and turbines, such as gas turbines, steam turbines, and hydro turbines. Generally, turbomachines include a rotor, which may be a shaft or drum, to which turbomachine blades are attached. Certain turbomachine blades may include tip shrouds to meet structural and/or performance requirements. For example, the tip shroud of a turbomachine blade may reduce leakage or cross flow from a pressure side (e.g., a concave face) to a suction side (e.g., a convex face) side of the turbomachine blade. However, the tip shroud may be subjected to centrifugal loading, which may cause elevated stresses at the root of the tip shroud and potentially reduce the useful life of the turbomachine blade and/or the rotor.

BRIEF DESCRIPTION OF THE INVENTION

Certain embodiments commensurate in scope with the originally claimed invention are summarized below. These embodiments are not intended to limit the scope of the claimed invention, but rather these embodiments are intended only to provide a brief summary of possible forms of the invention. Indeed, the invention may encompass a variety of forms that may be similar to or different from the embodiments set forth below.

In a first embodiment, a system includes a tip shroud including a rail of a labyrinth seal. The rail is crosswise to a mean camber line of a turbomachine blade. The tip shroud also includes a leading edge portion extending from a first side of the rail. The leading edge portion includes a first suction side portion and a first pressure side portion. The first pressure side portion has a surface area that is at least fifty percent greater than a surface area of the first suction side portion. The tip shroud further includes a trailing edge portion extending from a second side of the rail. The trailing edge portion includes a second suction side portion and a second pressure side portion. The second pressure side portion has a surface area that is at least fifty percent greater than a surface area of the second suction side portion.

In a second embodiment, a system includes a tip shroud including a pressure side portion and a suction side portion. The pressure side portion and the suction side portion are divided by a mean camber line of a turbomachine blade, and the pressure side portion has surface area that is at least fifty percent greater than a surface area of the suction side portion. The pressure side portion includes a first leading edge portion and a first trailing edge portion, and the suction side portion includes a second leading edge portion and a second trailing edge portion. Additionally, the tip shroud includes a rail of a labyrinth seal. The rail is crosswise to the mean camber line, and the rail separates the first leading edge portion from the first trailing edge portion and separates the second leading edge portion from the second trailing edge portion. Additionally, the second trailing edge portion extends from the rail at an intermediate point on the rail between a suction side endpoint of the rail and a pressure side endpoint of the rail, and the intermediate point is offset from the suction side endpoint by at least ten percent of a total length of the rail In a third embodiment, a turbomachine blade includes a turbomachine blade tip shroud. The turbomachine blade tip shroud includes a leading edge portion including a first suction side portion and a first pressure side portion. The first pressure side portion has a surface area that is at least fifty percent greater than a surface area of the first suction side portion. The turbomachine blade tip shroud further includes a trailing edge portion including a second suction side portion and a second pressure side portion. The second pressure side portion has a surface area that is at least fifty percent greater than a surface area of the second suction side portion. The trailing edge portion includes a trailing edge overhang extending over a trailing edge of the turbomachine blade. The trailing edge overhang includes a trailing edge surface that forms an angle of at least 80 degrees with a mean camber line of the turbomachine blade on a pressure side of the mean camber line.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein:

FIG. 2 is a partial side view, taken within line 2-2 of FIG. 1, of a turbomachine (e.g., a turbine) having a turbomachine blade with a tip shroud, in accordance with embodiments of the present disclosure;

FIG. 3 is a cross-sectional bottom view, taken along line 3-3 of FIG. 2, of a turbomachine blade, illustrating a tip shroud, in accordance with embodiments of the present disclosure;

FIG. 4 is a perspective view of a tip shroud, illustrating a leading edge overhang of the tip shroud, in accordance with embodiments of the present disclosure;

FIG. 5 is a top view of a tip shroud, illustrating a leading edge portion of the tip shroud with asymmetrical sides, in accordance with embodiments of the present disclosure;

FIG. 6 is a top view of a tip shroud, illustrating a trailing edge portion of the tip shroud with asymmetrical sides, in accordance with embodiments of the present disclosure;

FIG. 7 is a top view of adjacent tip shrouds in contact with one another, in accordance with embodiments of the present disclosure;

DETAILED DESCRIPTION OF THE INVENTION

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

The disclosed embodiments include improved geometries for a turbomachine blade tip shroud. Specifically, the tip shrouds described below may include various geometric features such as a leading edge overhang, which may have asymmetric pressure and suction sides. Additionally, the tip shroud may include geometric features such as asymmetric suction sides and pressure sides at the leading edge and/or trailing edge. As described in detail below, one or more of these geometric features may improve the efficiency of the turbomachine blade or the turbomachine as a whole. Furthermore, the disclosed geometric features may improve the useful life and longevity of the turbomachine blade or turbomachine as a whole. For example, in certain embodiments, the disclosed tip shroud geometries may reduce the weight of the tip shroud, thereby reducing the centrifugal mechanical load on the turbomachine blade. In this manner, stresses in the tip shroud and turbomachine blade may be reduced. Additionally, the asymmetric tip shroud and/or scalloping techniques described below may be an improvement over symmetric tip shroud techniques, which may reduce the adverse impact of scalloped tip shrouds on turbomachine performance. While the disclosed improved tip shroud geometries may be utilized with turbomachine blades of a variety of turbomachines (e.g., turbines and compressors), the following discussion describes improved tip shrouds in the context of a turbine, such as a gas turbine or a steam turbine. However, it is important to note that the following discussion is not intended to limit the application of the disclosed improved tip shrouds to turbines.

Figure 1:
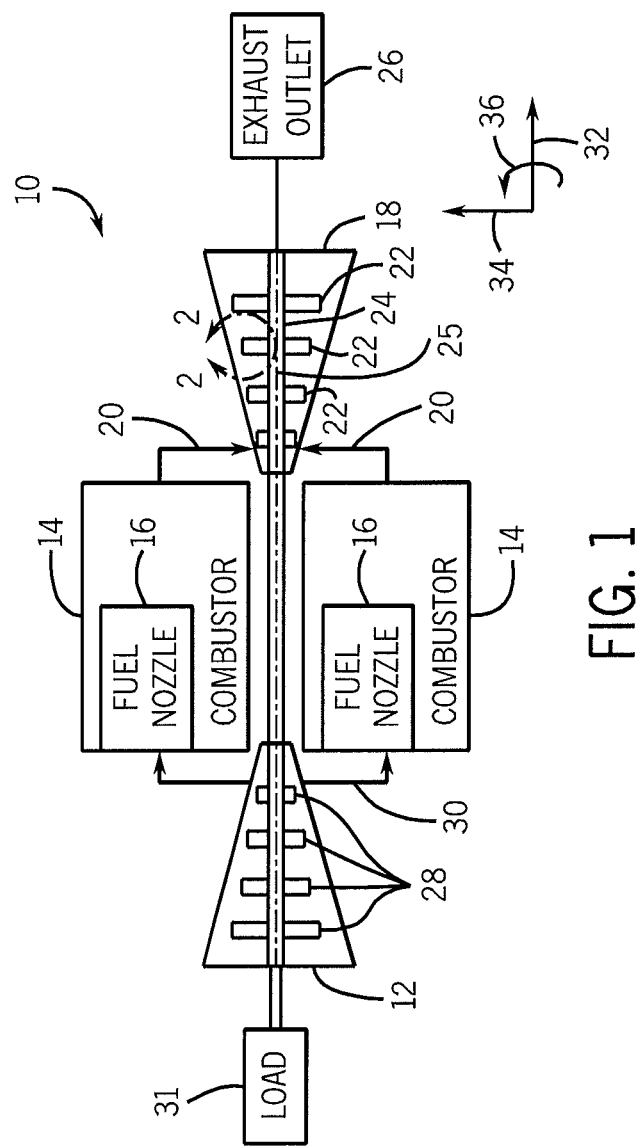
FIG. 1 is a schematic block diagram of an embodiment of a gas turbine system having blades with improved tip shrouds.

Turning now to the drawings, FIG. 1 is a schematic block diagram of an embodiment of a gas turbine system 10 having turbine blades 22 with improved tip shrouds. The gas turbine system 10 includes a compressor 12, combustors 14 having fuel nozzles 16, and a turbine 18. The fuel nozzles 16 route a liquid fuel and/or gas fuel, such as natural gas or syngas, into the combustors 14. The combustors 14 ignite and combust a fuel-air mixture, and then pass hot pressurized combustion gases 20 (e.g., exhaust) into the turbine 18. The turbine blades 22 are coupled to a rotor 24, which is also coupled to several other components throughout the gas turbine system 10, as illustrated. As the combustion gases 20 pass through the turbine blades 22 in the turbine 18, the turbine 18 is driven into rotation, which causes the rotor 24 to rotate along a rotational axis 25. Eventually, the combustion gases 20 exit the turbine 18 via an exhaust outlet 26.

In the illustrated embodiment, the compressor 12 includes compressor blades 28. The compressor blades 28 within the compressor 12 are also coupled to the rotor 24, and rotate as the rotor 24 is driven into rotation by the turbine 18, as described above. As the compressor blades 28 rotate within the compressor 12, the compressor blades 28 compress air from an air intake into pressurized air 30, which is routed to the combustors 14, the fuel nozzles 16, and other portions of the gas turbine system 10. The fuel nozzles 16 then mix the pressurized air and fuel to produce a suitable fuel-air mixture, which combusts in the combustors 14 to generate the combustion gases 20 to drive the turbine 18. Further, the rotor 24 may be coupled to a load 31, which may be powered via rotation of the rotor 24. For example, the load 31 may be any suitable device that may generate power via the rotational output of the gas turbine system 10, such as a power generation plant or an external mechanical load. For instance, the load 31 may include an electrical generator, a propeller of an airplane, and so forth. In the following discussion, reference may be made to various directions, such as an axial direction or axis 32, a radial direction or axis 34, and a circumferential direction or axis 36 of the turbine 18.

FIG. 2 is a partial side view, taken within line 2-2 of FIG. 1, of the turbine 18, illustrating a turbine blade 22 (e.g., airfoil) having a tip shroud 50. As will be appreciated, the tip shroud 50 may serve to block tip leakage between a radial end 52 of the turbine blade 22 and a stationary structural component 54. For example, the stationary structural component 54 may be a turbine casing, housing, shroud, and so forth. In other words, the tip shroud 50 may help block a fluid flow 56 (e.g., of the combustion gases 20 from the combustor 14) within the turbine 18 from passing from a pressure side 58 to a suction side 60 of the turbine blade 22 through a clearance 62 between the radial end 52 of the turbine blade 22 and the stationary structural component 54. Furthermore, the tip shroud 50 may also dampen vibrations in the turbine blade 22. In certain embodiments, the tip shroud 50 may also include a labyrinth seal 64, which further blocks the fluid flow 56 from passing from the pressure side 58 to the suction side 60 through the clearance 62. In the illustrated embodiment, the labyrinth seal 64 includes a single rail 66, which extends in the radial direction 34 towards the stationary structural component 54. In other embodiments, such as the embodiment illustrated in FIG. 7, the labyrinth seal 64 may include multiple rails 66.

As mentioned above, the tip shroud 50 is disposed on the radial end 52 of the turbine blade 22. Specifically, the tip shroud 50 extends laterally from an outer surface 68 of the turbine blade 22 about a perimeter of the turbine blade 22. As discussed in detail below, the geometry of the tip shroud 50 may vary. For example, different portions of the tip shroud 50, e.g., a leading edge portion, a trailing edge portion, a suction side portion, and a pressure side portion, may have different contours, shapes, etc. In other words, different portions of the tip shroud 50 may extend laterally from the outer surface 68 of the turbine blade 22 by different amounts. For example, as discussed below, the tip shroud 50 may have asymmetric pressure and suction sides.

FIG. 3 is a cross-sectional bottom view, taken along line 3-3 of FIG. 2, of the tip shroud 50, illustrating a leading edge overhang 100 of the tip shroud 50. As such, the cross-sectional view illustrated in FIG. 3 depicts the side of the tip shroud 50 that faces away from the stationary structural component 54 (e.g., the tip shroud 50 as viewed from the rotor 24). As mentioned above, the tip shroud 50 extends laterally from the outer surface 68 of the turbine blade 22 (e.g., airfoil). Additionally, the tip shroud 50 includes various portions, which may have different geometries, contours, or shapes. For example, the tip shroud 50 includes a suction side portion 102 and a pressure side portion 104. As will be appreciated, the suction side portion 102 of the tip shroud 50 extends laterally from the suction side 60 of the turbine blade 22. Similarly, the pressure side portion 104 extends laterally from the pressure side 58 of the turbine blade 22. As shown, the suction side 60 and the pressure side 58 of the turbine blade may be separated (i.e., divided) by a mean camber line 106 of the turbine blade 22. The mean camber line 106 is generally defined by a spanwise average width 108 of the turbine blade 22.

As mentioned above, the tip shroud 50 in the illustrated embodiment includes the leading edge overhang 100. That is, the leading edge overhang 100 is a lateral extension of the tip shroud 50 from the turbine blade 22 at a leading edge 110 of the turbine blade 22. More specifically, the leading edge overhang 100 extends laterally from the turbine blade 22 and ahead of the leading edge 110 along the mean camber line 106 of the turbine blade 22. As discussed in detail below, the leading edge overhang 100 may help block the fluid flow 56 from passing over the radial end 52 of the turbine blade 22 through the clearance 62 between the radial end 52 of the turbine blade 22 and the stationary structural component 54. In this manner, vortex flow generation and pressure mixing (i.e., pressure mixing between the suction side 60 and the pressure side 58 of the turbine blade 22) may be reduced, thereby improving the efficiency of the turbine blade 22.

In the illustrated embodiment, the leading edge overhang 100 extends a distance 112 ahead of the leading edge 110 of the turbine blade 22. The distance 112 of the leading edge overhang 100 may be expressed as a percentage of a total chord length 114 of the turbine blade 22. As will be appreciated, the total chord length 114 of the turbine blade 22 may be defined as a distance between the leading edge 110 of the turbine blade 22 and a trailing edge 116 of the turbine blade 22 along the mean camber line 106. For example, the distance 112 of the leading edge overhang 100 may be approximately 1 to 20, 2 to 18, 3 to 16, 4 to 14, 5 to 12 or 6 to 10 percent of the total chord length 114 of the turbine blade 22. Additionally, in certain embodiments, the leading edge overhang 100 may have an asymmetric geometry. In other words, as discussed in detail below, the leading edge overhang 100 may be asymmetric about the mean camber line 106 (i.e., the leading edge overhang 100 may include asymmetric pressure side and suction side portions). Similarly, in certain embodiments, the trailing edge 116 may include an extension or overhang similar to the leading edge overhang 100. For example, the trailing edge 116 may include a trailing edge overhang 118, which may extend behind the trailing edge 116 of the turbine blade 22.

FIG. 4 is a perspective view, taking within line 4-4 of FIG. 3, of the leading edge overhang 100 of the tip shroud 50 extending over, and ahead of, the leading edge 110 of the turbine blade 22 and generally in a negative axial direction 111 of the turbine 18. In other words, the negative axial direction 111 is generally in an upstream direction along the axis 32 of the turbine 18. As previously mentioned, the leading edge overhang 100 may help block the fluid flow 56 from passing over the radial end 52 of the turbine blade 22. For example, the leading edge overhang 100 may direct the fluid flow 56 down the turbine blade 22, as indicated by arrow 120. Similarly, the leading edge overhang 100 may direct the fluid flow 56 across the pressure side 58 of the turbine blade 22, as indicated by arrow 122. In this manner, fluid flow 56 leakage over the radial end 52 of the turbine blade 22 is reduced, thereby improving the efficiency of the turbine 18.

FIG. 5 is a top view of the tip shroud 50, illustrating a leading edge portion 150 of the tip shroud 50 with asymmetrical sides. As such, the top view illustrated in FIG. 5 (as well as FIGS. 6 and 7) depicts the side of the tip shroud 50 that faces toward the stationary structural component 54. The leading edge portion 150 of the tip shroud 50 has a pressure side portion 152 (i.e. corresponding to the pressure side 58 of the turbine blade 22) that is asymmetrical to a suction side portion 154 (i.e. corresponding to the suction side 60 of the turbine blade 22) of the tip shroud 50. As similarly discussed above, the pressure side portion 152 and the suction side portion 154 of the leading edge portion 150 are separated by the mean camber line 106 of the turbine blade 22. In the illustrated embodiment, the leading edge portion 150 of the tip shroud 50 is generally separated from a trailing edge portion 156 of the tip shroud 50 by the rail 66 of the labyrinth seal 64. In certain embodiments, the leading edge portion 150 may include the leading edge overhang 100 discussed above. In other words, the leading edge overhang 100 may extend over the leading edge 110 of the turbine blade 22 and may be asymmetrical about the mean camber line 106.

As previously mentioned, the pressure side portion 152 and the suction side portion 154 of the leading edge portion 150 of the tip shroud 50 are asymmetrical. For example, in the illustrated embodiment, the pressure side portion 152 is larger than the suction side portion 154. In other words, the pressure side portion 152 of the tip shroud 50 has a substantially greater surface area extending laterally from the outer surface 68 of the turbine blade 22 than the suction side portion 154 of the tip shroud 50. For example, in certain embodiments, the surface area of the pressure side portion 152 of the tip shroud 50 may be approximately 5 to 500, 10 to 400, 15 to 300, 20 to 250, 25 to 200, 30 to 150, 40 to 100, or 45 to 50 percent larger than the surface area of the suction side portion 154. In this manner, fluid flow 56 migration from the high pressure fluid region underneath pressure side portion 152 to lower pressure fluid region underneath suction side portion 154 through the clearance 62 between tip shroud 50 and the stationary structural component 54 may reduce, thereby reducing the mixing loss associated with this fluid flow migration. Consequently, the turbine blade 22 and turbine 18 may experience improved efficiency. Additionally, the size of the suction side portion 154 of the tip shroud 50 may be reduced, thereby decreasing the total weight of the tip shroud 50. As will be appreciated, decreasing the overall weight of the tip shroud 50 may reduce the centrifugal mechanical load on the turbine blade 22 and the rotor 24 when the turbine 18 is in operation.

FIG. 6 is a top view of the tip shroud 50, illustrating the trailing edge portion 156 of the tip shroud 50 with asymmetrical sides. More specifically, the trailing edge portion 156 of the tip shroud 50 has a pressure side portion 160 (i.e. corresponding to the pressure side 58 of the turbine blade 22) that is asymmetrical to a suction side portion 162 (i.e. corresponding to the suction side 60 of the turbine blade 22) of the tip shroud 50. As similarly discussed above, the pressure side portion 160 and the suction side portion 162 of the trailing edge portion 156 are separated by the mean camber line 106 of the turbine blade 22. As with the leading edge portion 150 shown in FIG. 5, the trailing edge portion 156 of the tip shroud 50 in the illustrated embodiment is generally separated from the leading edge portion 150 of the tip shroud 50 by the rail 66 of the labyrinth seal 64.

As previously mentioned, the pressure side portion 160 and the suction side portion 162 of the trailing edge portion 156 of the tip shroud 50 are asymmetrical about the mean camber line 106 of the turbine blade 22. More specifically, in the illustrated embodiment, the pressure side portion 160 is larger than the suction side portion 162. In other words, the pressure side portion 160 of the trailing edge portion 156 of the tip shroud 50 has a greater surface area extending laterally from the outer surface 68 of the turbine blade 22 than the suction side portion 162 of the trailing edge portion 156 of the tip shroud 50. For example, in certain embodiments, the surface area of the pressure side portion 160 of the tip shroud 50 may be approximately 5 to 400, 10 to 350, 15 to 300, 20 to 250, 25 to 200, 30 to 150, 40 to 100, or 45 to 50 percent larger than the surface area of the suction side portion 162. In this manner, fluid flow 56 migration from the high pressure fluid region underneath pressure side portion 160 to the lower pressure fluid region underneath suction side portion 162 through the clearance 62 between the tip shroud 50 and a stationary structural component 54 may reduce, thereby reducing the mixing loss associated with this fluid flow migration. Additionally, this migrated fluid flow 56 interaction with leakage flow over the rail 66 may be reduced, potentially resulting in reduced mixing loss. Consequently, the turbine blade 22 and the turbine 18 may experience improved efficiency. Furthermore, the size of the suction side portion 162 of the tip shroud 50 may be reduced, thereby decreasing the total weight of the tip shroud 50. As will be appreciated, decreasing the overall weight of the tip shroud 50 may reduce the centrifugal mechanical load on the turbine blade 22 and the rotor 24 when the turbine 18 is in operation.

FIG. 7 is a top view of two adjacent tip shrouds 50, illustrating contact between the two tip shrouds 50. More specifically, a first tip shroud 164 may be positioned on one turbine blade 22, and a second tip shroud 166 may be positioned on an adjacent turbine blade 22 of the same stage or row of turbine blades 22 coupled to the rotor 24. As shown, the two adjacent tip shrouds 50 (e.g., the first tip shroud 164 and the second tip shroud 166) are in contact with one another, as they are on adjacent turbine blades 22. For example, a suction side portion 168 of the first tip shroud 164 makes physical contact with a pressure side portion 170 of the second tip shroud 166. As will be appreciated, tip shrouds 50 of the turbine blade 22 may have physical contact with tip shrouds 50 of adjacent turbine blades 22 to improve mechanical stiffness of the turbine blades 22.

The adjacent tip shrouds 50 (e.g., the first tip shroud 164 and the second tip shroud 166) may have asymmetrical sides, in the manner described above. For example, the first tip shroud 164 has a pressure side portion 172 which is asymmetrical to and has a greater surface area than the suction side portion 168 of the first tip shroud 164. Similarly, the pressure side portion 170 of the second tip shroud 166 may be asymmetrical to and have a greater surface area than a suction side portion 174 of the second tip shroud 166.

Figure 8:
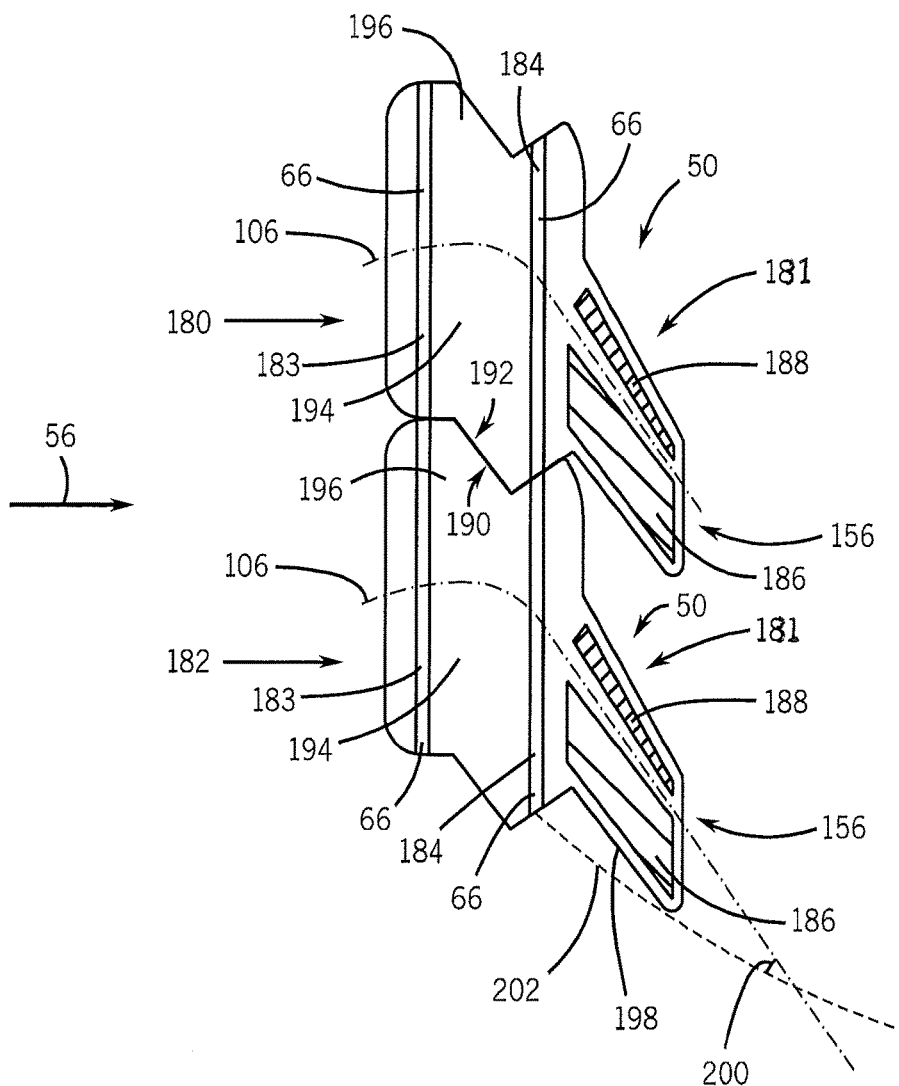
FIG. 8 is a top view of adjacent scalloped tip shrouds with each tip shroud having two rails, in accordance with embodiments of the present disclosure.

FIG. 8 is a top view of an embodiment of two tip shrouds 50, illustrating the trailing edge portion 156 of each tip shroud 50 having asymmetrical sides. As shown, the two tip shrouds 50 contact one another, as similarly described above with regard to FIG. 7. That is, a first tip shroud 180 may be positioned on one turbine blade 22, and a second tip shroud 182 may be positioned on another adjacent turbine blade 22 of the same stage or row. Additionally, the illustrated embodiment of the tip shrouds 50 includes scalloped portions 181, and labyrinth seals 64 of each tip shroud 50 includes two rails 66 (e.g., a first rail 183 and a second rail 184). As will be appreciated, the tip shroud 50 may include the scalloped portions 181 to further reduce the weight of the tip shroud 50, and thereby reduce the centrifugal mechanical load on the turbine blade 22 and the rotor 24 when the turbine 18 is in operation. More specifically, the scalloped portions 181 may be formed by forming indentions or notches in the tip shroud 50, as shown. In other words, material from the tip shroud 50 may be removed to form the scalloped portions 181, thereby reducing the weight of the tip shroud 50.

As shown, the trailing edge portion 156 of each tip shroud includes a pressure side portion 186 (i.e. corresponding to the pressure side 58 of the turbine blade 22) and a suction side portion 188 (i.e. corresponding to the suction side 60 of the turbine blade 22), where the pressure side portion 186 and the suction side portion 188 are asymmetrical about the mean camber line 106 of the turbine blade 22. As similarly discussed above with respect to FIG. 6, the pressure side portion 186 has a greater surface area than the suction side portion 188. In this manner, fluid flow 56 migration from the high pressure fluid region underneath pressure side portion 186 to lower pressure fluid region underneath suction side portion 188 through the clearance 62 between tip shroud 50 and the stationary structural component 54 may reduce, thereby reducing the mixing loss associated with this fluid flow migration. Additionally, the fluid flow 56 interaction with leakage flow over the rails 66 may be reduced, potentially resulting in reduced mixing loss. Consequently, the turbine blade 22 and the turbine 18 may experience improved efficiency. Furthermore, the size of the suction side portion 188 of the tip shroud 50 may be reduced, thereby decreasing the total weight of the tip shroud 50. As will be appreciated, decreasing the overall weight of the tip shroud 50 may reduce the centrifugal mechanical load on the turbine blade 22 and the rotor 24 when the turbine 18 is in operation.

Additionally, as mentioned above, the two tip shrouds 50 in the illustrated embodiment are in contact with one another, which may improve the mechanical stiffness of the turbine blades 22. For example, the two tip shrouds 50 have substantially full coverage between the first and second rails 183 and 184 of each tip shroud 50. In other words, a suction side surface 190 of the first tip shroud 180 between the first and second rails 183 and 184 of the first tip shroud 180 is substantially fully covered. Similarly, a pressure side surface 192 of the second tip shroud 182 is substantially fully covered between the first and second rails 183 and 184 of the second tip shroud 182. In certain embodiments, upstream of the second rail 184 (e.g., between the first and second rails 183 and 184), the respective surface areas of a pressure side 194 and a suction side 196 of the tip shroud 50 may be substantially fully covered (e.g., similarly sized surface areas) to form a full cylindrical/conical ring over the turbine blade 22 tip. In other embodiments, the surface area of the pressure side 194 may be greater than the surface area of the suction side 196 upstream of the second rail 184.

Additionally or alternatively, aft of the second rail 184, the respective surface areas of the pressure side and the suction side of the tip shroud 50 may be asymmetrical. Specifically, as described above, the trailing edge portion 156 (e.g., the portion of the tip shroud 50 aft of the second rail 184) may be scalloped such that the pressure side portion 186 has a greater surface area than the suction side portion 188. In other words, the suction side portion 188 may have a cut-out or other portion removed (e.g., the scalloped portions 181), thereby decreasing the surface area of the suction side portion 188. By contrast, the pressure side portion 186 may not have a cut-out or other portion removed. As a result, in the illustrated embodiment of the trailing edge portions 156 of each tip shroud 50 (e.g., aft of the second rail 184), the suction side surface 190 of the first tip shroud 180 is not in substantially full contact with the pressure side surface 192 of the second tip shroud 182. Furthermore, in the illustrated embodiment, a pressure side surface 198 of the trailing edge portion 156 of each tip shroud 50 is generally parallel with the mean camber line 106 of each tip shroud 50 at the trailing edge portion 156. However, in other embodiments, the pressure side surface 198 of the trailing edge portion 156 may be formed at an angle 200 relative to the mean camber line 106 at the trailing edge portion 156, as indicated by dashed line 202. For example, the angle 200 may be approximately 0 to 75, 5 to 60, 10 to 45, or 15 to 30 degrees. As will be appreciated, the angle 200 may be selected to achieve a desired mechanical or aerodynamic performance.

Figure 9:
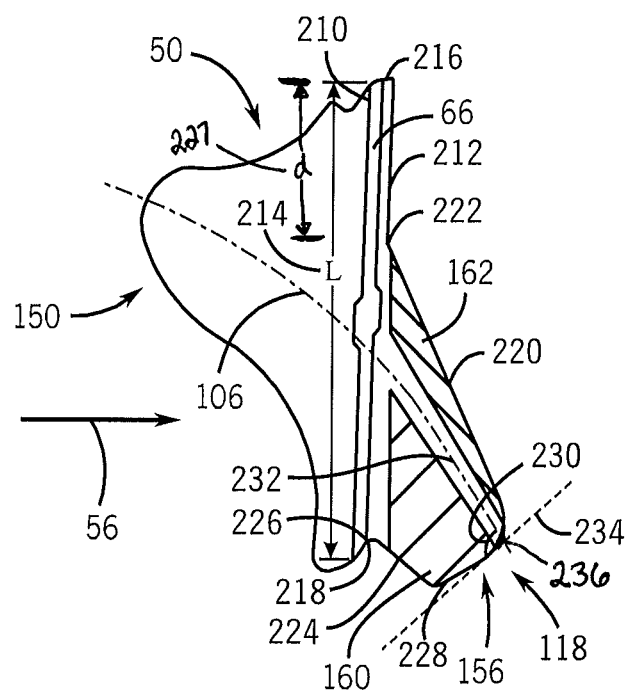
FIG. 9 is a top view of a tip shroud, illustrating a leading edge portion of the tip shroud and a trailing edge portion of the tip shroud, in accordance with embodiments of the present disclosure.

FIG. 9 is a top view of the tip shroud 50, illustrating the leading edge portion 150 and the trailing edge portion 156 of the tip shroud 50. More specifically, the leading edge portion 150 extends laterally from a first side 210 of the rail 66 and the trailing edge portion 156 extends laterally from a second side 212 of the rail 66. As illustrated, the leading edge portion 150 extends across a length 214 of the rail 66. Specifically, the leading edge portion 150 extends from a first endpoint 216 of the rail 66 (e.g., a suction side endpoint) to a second endpoint 218 of the rail 66 (e.g., a pressure side endpoint). In contrast, the trailing edge portion 156 extends across only a portion of the length 214 of the rail 66. For example, in the illustrated embodiment, the trailing edge portion 156 includes a suction side surface 220 that extends laterally from the second side 212 of the rail 66 at a first location 222 (e.g., an intermediate point) along the length 214 of the rail 66 between the first endpoint 216 of the rail 66 and the second endpoint 218 of the rail 66. In certain embodiments, the first location 222 is closer to the mean camber line 106 than the first endpoint 216 of the rail 66.

Further, the trailing edge portion 156 includes a pressure side surface 224 that extends laterally from the second side 212 of the rail 66 at a second location 226 along the length 214 of the rail 66. In the illustrated embodiment, the second location 226 is approximately the same location as the second endpoint 218. It should be appreciated that the first location 222 and the second location 226 may vary in other embodiments and may be selected to achieve a desired mechanical or aerodynamic performance. However, in certain embodiments, the first location 222 and the second location 226 may be selected such that the trailing edge portion 156 extends across only a portion of the length 214 of the rail 66. In other words, in certain embodiments, a portion of the rail 66 extends past the trailing edge portion 156. For example, the rail 66 may extend a distance 227 ahead of the suction side surface 220 of the trailing edge portion 156 (e.g., ahead of the first location 222, the intermediate point). The distance 227 may be expressed as a percentage of the length 214 of the rail 66. For example, the distance 227 may be approximately 10 to 60, 15 to 55, 20 to 50, 25 to 45, or 30 to 40 percent of the length 214 of the rail 66.

Further, the trailing edge portion 156 includes a trailing edge surface 228 that extends from the suction side surface 220 to the pressure side surface 224. The trailing edge surface 228 forms an angle 230 with a pressure side 232 of the mean camber line 106, as indicated by dashed line 234, at an intersection point 236 of the trailing edge surface 228 and the mean camber line 106. For example, the angle 230 may be at least 80 degrees, at least 85 degrees, at least 90 degrees, or any other suitable angle. In certain embodiments, the angle 230 may be approximately 80 to 170, 80 to 150, 80 to 130, 80 to 110, or 80 to 90 degrees. As will be appreciated, the angle 230 may be selected to achieve a desired mechanical or aerodynamic performance.

As discussed in detail above, the disclosed embodiments are directed towards an improved geometry for a turbomachine blade tip shroud 50. More specifically, embodiments of the tip shroud 50 described above may include one or more features such as the leading edge overhang 100. Furthermore, the tip shroud 50 may include the leading edge portion 150 with asymmetric pressure and suction portions 152 and 154. Similarly, the tip shroud may include the trailing edge portion 156 with asymmetric pressure and suction portions 160 and 162. As discussed above, these improved geometries may help reduce the weight of the tip shroud 50 while still blocking the fluid flow 56 from passing over the radial end 52 of the turbomachine blade 22. In this manner, the performance of the turbomachine blade 22 is improved, while reducing the centrifugal mechanical load on the turbomachine blade 22 and the rotor 24, thereby improving the overall efficiency of the turbomachine 18. It should be noted that any of the features described in any of the figures above may be combined with other features described in other figures in any desired combination.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:
1. A system, comprising:
a tip shroud, comprising:
a rail of a labyrinth seal, wherein the rail is crosswise to a mean camber line of a turbomachine blade;
a leading edge portion extending from a first side of the rail, wherein the leading edge portion comprises a first suction side portion and a first pressure side portion, the first suction side portion and the first pressure side portion are separated by the mean camber line, and the first pressure side portion has a surface area that is at least fifty percent greater than a surface area of the first suction side portion;
a trailing edge portion extending from a second side of the rail, wherein the trailing edge portion comprises a second suction side portion and a second pressure side portion, the second suction side portion and the second pressure side portion are separated by the mean camber line, and the second pressure side portion has a surface area that is at least fifty percent greater than a surface area of the second suction side portion;
wherein the trailing edge portion comprises a suction side surface extending from the second side of the rail at a first location along a length of the rail, a pressure side surface extending from the second side of the rail at a second location along the length of the rail, and a trailing edge surface extending from the suction side surface to the pressure side surface; and wherein the trailing edge surface forms an angle of at least 80 degrees with the mean camber line at an intersection point of the trailing edge surface and the mean camber line.

2. The system of claim 1, wherein the length of the rail extends from a suction side endpoint of the rail to a pressure side endpoint of the rail, and the first location is closer to the mean camber line than the suction side endpoint.

3. The system of claim 1, wherein the rail extends past the second suction side portion of the trailing edge portion by a distance that is at least ten percent of a total length of the rail.

4. The system of claim 1, wherein a length of the rail extends from a pressure side endpoint of the rail to a suction side endpoint of the rail, and the trailing edge portion extends across only a portion of the length of the rail.

5. The system of claim 4, wherein the leading edge portion extends from the pressure side endpoint of the rail to the suction side endpoint of the rail.

6. The system of claim 1, comprising the turbomachine blade having the tip shroud.

7. The system of claim 6, comprising a turbomachine having the turbomachine blade.

8. A system, comprising:
a tip shroud, comprising:
a rail of a labyrinth seal, wherein the rail is crosswise to a mean camber line of a turbomachine blade;
a leading edge portion extending from a first side of the rail, wherein the leading edge portion comprises a first suction side portion and a first pressure side portion, the first suction side portion and the first pressure side portion are separated by the mean camber line, and the first pressure side portion has a surface area that is at least fifty percent greater than a surface area of the first suction side portion;
a trailing edge portion extending from a second side of the rail, wherein the trailing edge portion comprises a second suction side portion and a second pressure side portion, the second suction side portion and the second pressure side portion are separated by the mean camber line, and the second pressure side portion has a surface area that is at least fifty percent greater than a surface area of the second suction side portion; and
wherein the trailing edge portion comprises a trailing edge overhang extending over a trailing edge of the turbomachine blade, the trailing edge overhang comprises a trailing edge surface, and the trailing edge surface forms an angle of at least 80 degrees with the mean camber line on a pressure side of the mean camber line.

9. A system, comprising:
a tip shroud, comprising:
a pressure side portion and a suction side portion, wherein the pressure side portion and the suction side portion are divided by a mean camber line of a turbomachine blade, the pressure side portion has a surface area that is at least fifty percent greater than a surface area of the suction side portion, the pressure side portion comprises a first leading edge portion and a first trailing edge portion, and the suction side portion comprises a second leading edge portion and a second trailing edge portion;
a rail of a labyrinth seal, wherein the rail is crosswise to the mean camber line, and the rail separates the first leading edge portion from the first trailing edge portion and separates the second leading edge portion from the second trailing edge portion, wherein the second trailing edge portion extends from the rail at an intermediate point on the rail between a suction side endpoint of the rail and a pressure side endpoint of the rail, and the intermediate point is offset from the suction side endpoint by at least ten percent of a total length of the rail; and wherein the second trailing edge portion comprises a suction side surface, the first trailing edge portion comprises a pressure side surface and a trailing edge surface extending from the suction side surface to the pressure side surface, and the trailing edge surface forms an angle of at least 80 degrees with the mean camber line on a pressure side of the mean camber line.

10. The system of claim 9, wherein the first trailing edge portion extends from the rail at the pressure side endpoint of the rail, the first leading edge portion extends from the rail at the pressure side endpoint of the rail, and the second leading edge portion extends from the rail at the suction side endpoint of the rail.

11. The system of claim 9, comprising the turbomachine blade having the tip shroud.

12. The system of claim 11, comprising a turbomachine having the turbomachine blade.

13. A system, comprising:
a tip shroud, comprising:
a pressure side portion and a suction side portion, wherein the pressure side portion and the suction side portion are divided by a mean camber line of a turbomachine blade, the pressure side portion has a surface area that is at least fifty percent greater than a surface area of the suction side portion, the pressure side portion comprises a first leading edge portion and a first trailing edge portion, and the suction side portion comprises a second leading edge portion and a second trailing edge portion;
a rail of a labyrinth seal, wherein the rail is crosswise to the mean camber line, and the rail separates the first leading edge portion from the first trailing edge portion and separates the second leading edge portion from the second trailing edge portion,
wherein the second trailing edge portion extends from the rail at an intermediate point on the rail between a suction side endpoint of the rail and a pressure side endpoint of the rail, and the intermediate point is offset from the suction side endpoint by at least ten percent of a total length of the rail; and
wherein the first and second trailing edge portions comprise a trailing edge overhang extending over a trailing edge of the turbomachine blade, the trailing edge overhang comprises a trailing edge surface, and the trailing edge surface forms an angle of at least 80 degrees with the mean camber line on a pressure side of the mean camber line.

14. A turbomachine blade, comprising:
a turbomachine blade tip shroud, comprising:
a leading edge portion comprising a first suction side portion and a first pressure side portion, wherein the first pressure side portion has a surface area that is at least fifty percent greater than a surface area of the first suction side portion; and
a trailing edge portion comprising a second suction side portion and a second pressure side portion, wherein the second pressure side portion has a surface area that is at least fifty percent greater than a surface area of the second suction side portion, the trailing edge portion comprises a trailing edge overhang extending over a trailing edge of the turbomachine blade, and the trailing edge portion comprises a trailing edge surface that forms an angle of at least 80 degrees with a mean camber line of the turbomachine blade on a pressure side of the mean camber line.

15. The turbomachine blade of claim 14, wherein the turbomachine blade tip shroud comprises a rail of a labyrinth seal, the rail is crosswise to the mean camber line and separates the leading edge portion and the trailing edge portion.

16. The turbomachine blade of claim 15, wherein the rail extends past the second suction side portion by a distance that is at least 20 percent of a total length of the rail.

17. The turbomachine blade of claim 14, comprising a turbomachine having the turbomachine blade.

* * * * *